United States Patent

Rilbe

[11] Patent Number: 6,014,907
[45] Date of Patent: Jan. 18, 2000

[54] ADJUSTING DEVICE FOR PROVIDING CHANGES OF THE ANGLE OF ROTATION BETWEEN TWO ROTARY ELEMENTS

[75] Inventor: Ulf Rilbe, Västerås, Sweden

[73] Assignee: Scandrive Control AB, Kolback, Sweden

[21] Appl. No.: 09/011,856

[22] PCT Filed: Sep. 5, 1997

[86] PCT No.: PCT/SE97/01485

§ 371 Date: Feb. 19, 1998

§ 102(e) Date: Feb. 19, 1998

[87] PCT Pub. No.: WO98/13626

PCT Pub. Date: Apr. 2, 1998

[30] Foreign Application Priority Data

Sep. 23, 1996 [SE] Sweden .................................. 9603447

[51] Int. Cl.[7] ........................... F16H 35/00; B41F 13/008
[52] U.S. Cl. ............................. 74/395; 475/162; 101/248
[58] Field of Search ...................... 74/395, 640; 101/248, 101/220; 475/162, 168

[56] References Cited

U.S. PATENT DOCUMENTS

| 4,286,476 | 9/1981 | Stiff ........................................... 74/395 |
| 4,363,270 | 12/1982 | Ury et al. ................................. 101/248 |
| 5,123,300 | 6/1992 | Himmelein et al. ...................... 74/395 |
| 5,651,314 | 7/1997 | Gentle ...................................... 74/395 |

FOREIGN PATENT DOCUMENTS

| 938501798 | 4/1994 | European Pat. Off. . |
| 4022735 | 1/1991 | Germany . |
| 4310158 | 12/1994 | Germany . |
| 2234314 | 1/1991 | United Kingdom . |
| 9423223 | 10/1994 | WIPO . |
| 9617187 | 6/1996 | WIPO . |

Primary Examiner—Tamara L. Graysay
Assistant Examiner—William C Joyce
Attorney, Agent, or Firm—Young & Thompson

[57] ABSTRACT

An adjusting device for the fine adjustment of the angle of rotation between two rotary elements (1, 2), which are driving and driven, respectively, comprises first and second gear units (6, 17). The second gear unit (17) comprises two eccentric gear components (20, 20') which are internally connected via a coupling (21) that permits each component separately to perform eccentric translation movements. The sleeve components have external gear rings (22, 22') which cooperate with internal gear rings (23, 23'), that are co-rotatively connected with output and input rotary members (8, 9), respectively, of the first gear unit (6). The external gear ring (22, 22') of the individual eccentric gear component has a smaller diameter and fewer teeth than each internal gear ring (23, 23') and is eccentric relative to the same. By the fact that the second gear unit in one and the same step gives a large gear change, a relative rotary motion of, e.g., a stepping motor (19), after a further gear reduction in the first gear unit (6), may be geared down by an extremely large gear reduction and, thereby, provide an extremely fine adjustment of the driven element (2) in relation to the driving one (1).

12 Claims, 3 Drawing Sheets

ADJUSTING DEVICE FOR PROVIDING CHANGES OF THE ANGLE OF ROTATION BETWEEN TWO ROTARY ELEMENTS

TECHNICAL FIELD OF THE INVENTION

This invention relates to an adjusting device for providing changes of the angle of rotation between two rotary elements, which are driving and driven, respectively, and which under normal operation conditions shall be driven at one and the same rotary speed, comprising on one hand a first gear unit with a frame body, the first gear unit acting between the elements and being co-rotatively connected with one of said elements, in order to accompany it during rotation, input and output members being rotatable relative to the first gear unit in order to, when necessary, readjust or differentiate the angle of rotation between the elements, and on the other hand a second gear unit arranged to cooperate with an adjusting shaft that is rotatable between a given, not moving rest position during said normal operation conditions, and another position, the shaft during such rotation activating the second gear unit in order to transfer to one of the rotary members of the first gear unit a relative motion of the angle of rotation, which motion after a gear reduction by means of this gear unit provides for a restricted change of the angle of rotation between said driving and driven elements via the other rotary part.

1. Background of the Invention

In some fields of mechanical engineering, there is a need of fine adjustment of the positioning of the angle of rotation between two elements or shafts, which are driving and driven, respectively. This is the case for, e.g., printing machines in which a plurality of cylinders are normally driven synchronously by means of a main driving cylinder or shaft, for instance via bevel gear drives, external toothed transmission gears or gear belt transmissions. Now and then during operation, the need may arise of performing small corrections of the positions of the driven cylinders relative to the main driving cylinder, either in regard to the speed, for instance for fine-adjusting the tension in a continuous paper passing through the machine, or in regard to the adjustment of the angle of rotation of the individual cylinders in order to guarantee an accurate accordance between different printings on the continuous paper in consecutive cylinders. In both these cases, there are pronounced wants for the possibility of making a coarse adjustment within the range of 360°, followed by fine adjustments within a restricted region of angles of rotation, but with a very high resolution. Thus, an imaginary point on the envelope surface of the individual printing cylinder shall preferably be capable of being readjusted by a distance that amounts to a few millimeters, with a resolution of a few microns.

2. Prior Art

Previously known adjusting devices for the fine adjustment of cylinders in printing machines (e.g., of the type being commercially available under the denominations Tandler PD2, Conic HD and Harmonic Drive HDUA, respectively) have the general inconvenience that the driving cylinder or shaft has to be geared down before the fine adjustment of the driven cylinders can be made, to thereafter be geared up to full rotary speed, after having attained the desired position. This leads to considerable power losses and a troublesome release of heat. Furthermore, the accuracy of the fine adjustment is mediocre, at least as long as the device comprises merely two gear steps to guarantee the desired compactness.

An adjusting device of the initially generally described type is previously disclosed in WO 94/23223 (see also DE 43 10 158). It is true that in practice, this construction has the task of, when needed, making possible a differentiation of the rotary speeds of two output shafts or elements which are driven by a common axle, but in theory it could be modified for an application in a printing machine, i.e., in such a way that the angle of rotation of one single element is readjusted relative to a main driving element. According to this known construction, the first or primary gear unit consists of a cycloidal gear and the secondary gear unit of a planetary gear with double sets of planet wheels. The sun-wheel of the secondary planetary gear is co-rotatively connected to an adjusting shaft that is in a not moving rest position as long as the two driven elements are to be driven under normal or desired operation conditions, with a constant rotary speed relation. When this rotary speed relation is to be altered, the adjusting shaft is brought to rotate, the rotary motion of the shaft being transmitted via the two gear units to one of the two driven output elements under a differentiation of its rotary speed in relation to the rotary speed of the other element. However, a shortcoming of this adjusting device—which would make it inappropriate in connection with printing machines—is that the gear change of the planetary gear is limited, e.g. to a magnitude of 5:1. In practice, this moderate gear change ratio would namely lead to a mediocre accuracy when adjusting the cylinders of the machine. Moreover, the construction comprises a comparatively large number of movable components in the form of planet wheels; something that under bad manufacturing tolerances and plays due to wear, risks to further contribute to a bad adjusting accuracy.

OBJECTS AND CHARACTERISTICS OF THE INVENTION

As a basis for the present invention, lies the task of eliminating the above-mentioned inconveniences of previously known adjusting devices and providing an improved adjusting device. Therefore, a primary object of the invention is to create an adjusting device, by means of which extremely small changes of the angle of rotation shall be possible to provide between two rotary elements, which are driving and driven, respectively. A further object is to provide a device that manages to fulfil this task by means of simple means and by as few movable components as possible. Still another object of the invention is to provide an adjusting device that on one hand is compact, in a radial as well as an axial direction, and on the other hand has a high efficiency, and thereby a low heat release.

According to the invention, at least the primary object is attained by the features defined herein. Advantageous embodiments of the invention are further defined in he dependent claims.

BRIEF DESCRIPTION OF THE APPENDED DRAWINGS

In the drawings

FIG. 1 is a longitudinal section, partly as a view, of an adjusting device according to the invention, FIG. 2 is an enlarged longitudinal section showing the vital components of the device, and FIG. 3 is an enlarged cross-section 3—3 in FIG. 2.

DETAILED DESCRIPTION OF A PREFERRED EMBODIMENT OF THE INVENTION

Figure 1:
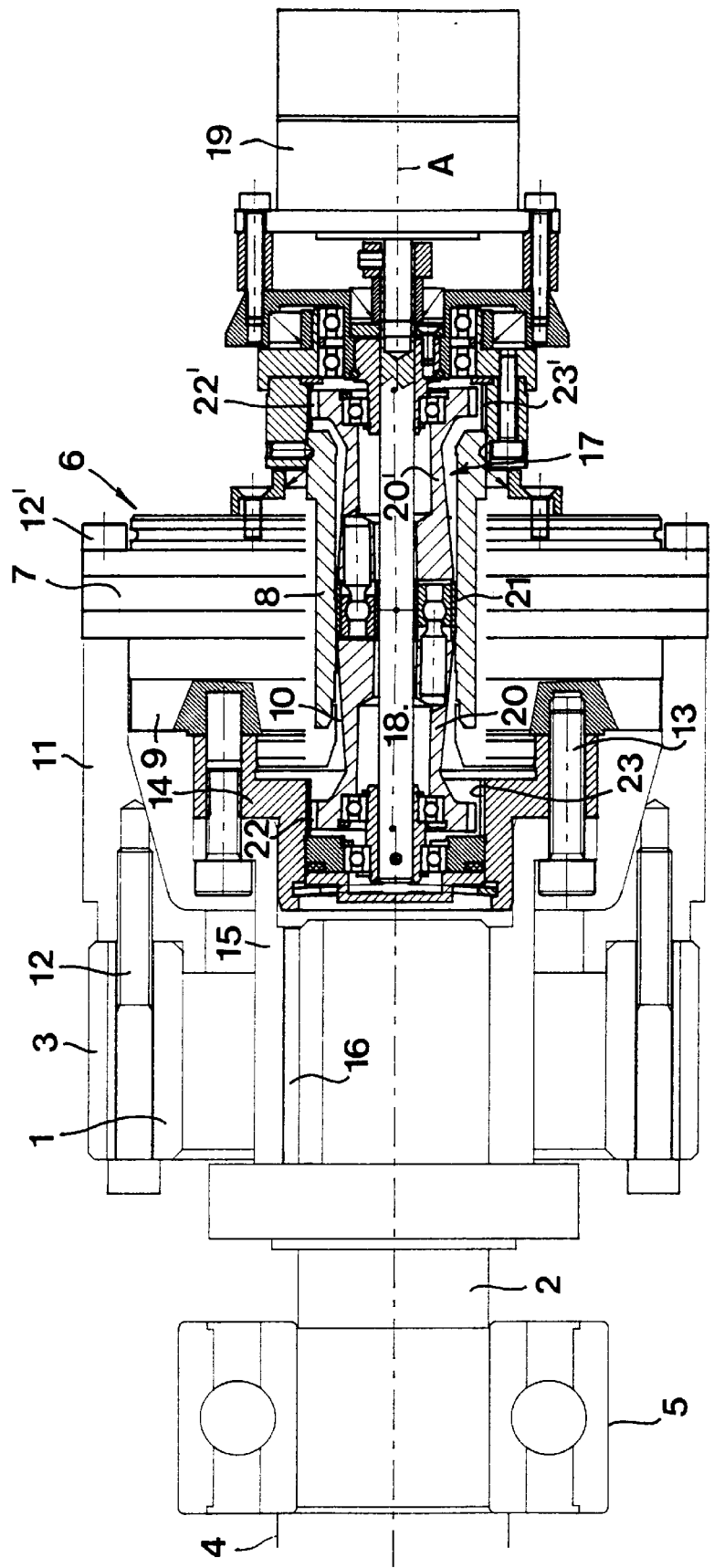

In FIG. 1, two elements which are driving and driven, respectively, are designated by reference numerals 1 and 2, respectively. According to the given embodiment, it is presumed that the element 1 is the driving one, or the input element, while the element 2 is the driven one, or the output element. The element 1 has the shape of a ring with an external gear ring 3 that meshes with, e.g., a gear wheel (not shown) comprised in a gear transmission by means of which torques are transferred to the element 1, for instance from a main driving shaft in a printing machine. According to the example, the driven element 2 has the shape of a shaft end of a printing cylinder 4. The shaft 2 is mounted in a bearing 5, which is fixedly mounted in an immobile stand (not shown) and which therefore determines the spacial placing of the device.

The device includes a schematically shown first gear unit, which in its entirety is designated by 6. This gear unit, which may have a relatively high gear reduction, e.g. in the range of 30:1–200:1, comprises a frame body 7 in the form of an externally cylindrical housing, and input and output members 8, 9, which are turnable or rotatable relative to the frame body. According to the given example, the rotary member 8 constitutes an input component, while rotary member 9 constitutes an output component. The gear 6 is provided with a central, through opening 10 with a comparatively large diameter. The existence of this opening means that the gear 6 basically has the shape of a ring.

Actually, the shown gear 6 may be of any suitable type. For this reason, the interior of the gear is not shown. However, in practice an eccentric gear is preferred, e.g., of the type as disclosed in EP 93850179.8 or WO 96/17187. An advantage of specifically eccentric gears is that these in one step make possible very large gear ratios. Thus, in practice an eccentric gear with the external dimensions that are indicated in the drawings may be given a gear ratio up to the magnitude of 200:1. Suppose that the gear ratio of the gear 6 is 179:1 (which constitutes a concrete example of a commercially available eccentric gear with the designation GREG-50). When the input rotary member 8 is set in motion relative to the frame body 7 and rotates by one revolution relative to the same, then the output rotary member 9 will rotate only by 1/179 of a revolution, in the opposite direction.

The driving ring element 1 and the gear frame body 7 are co-rotatively connected with each other via a ring-shaped connecting piece 11 and a screw joint 12, 12'. According to the shown example, the output rotary member 9 of the gear unit is co-rotatively connected via a further screw joint 13 with two connection sleeves 14, 15, of which the latter is in operative engagement with the shaft end 2 of the printing cylinder 4 via a keyed joint 16. In other terms, the printing cylinder is always driven with the same rotation speed as the output rotary member 9 of the gear unit 6.

According to the shown device, a second gear unit is also included, generally designated 17. This second gear unit cooperates with an adjusting shaft 18 that is turnable or rotatable between a given stationary rest position during normal operation conditions, and other arbitrary positions of angles of rotation. The turning or rotary motion between these positions may advantageously be brought about by means of a stepping motor 19, although other means are also feasible, for instance braking arrangements.

As far as the shown adjusting device has been hitherto described, it is substantially previously known from WO 94/23223.

Figure 2:
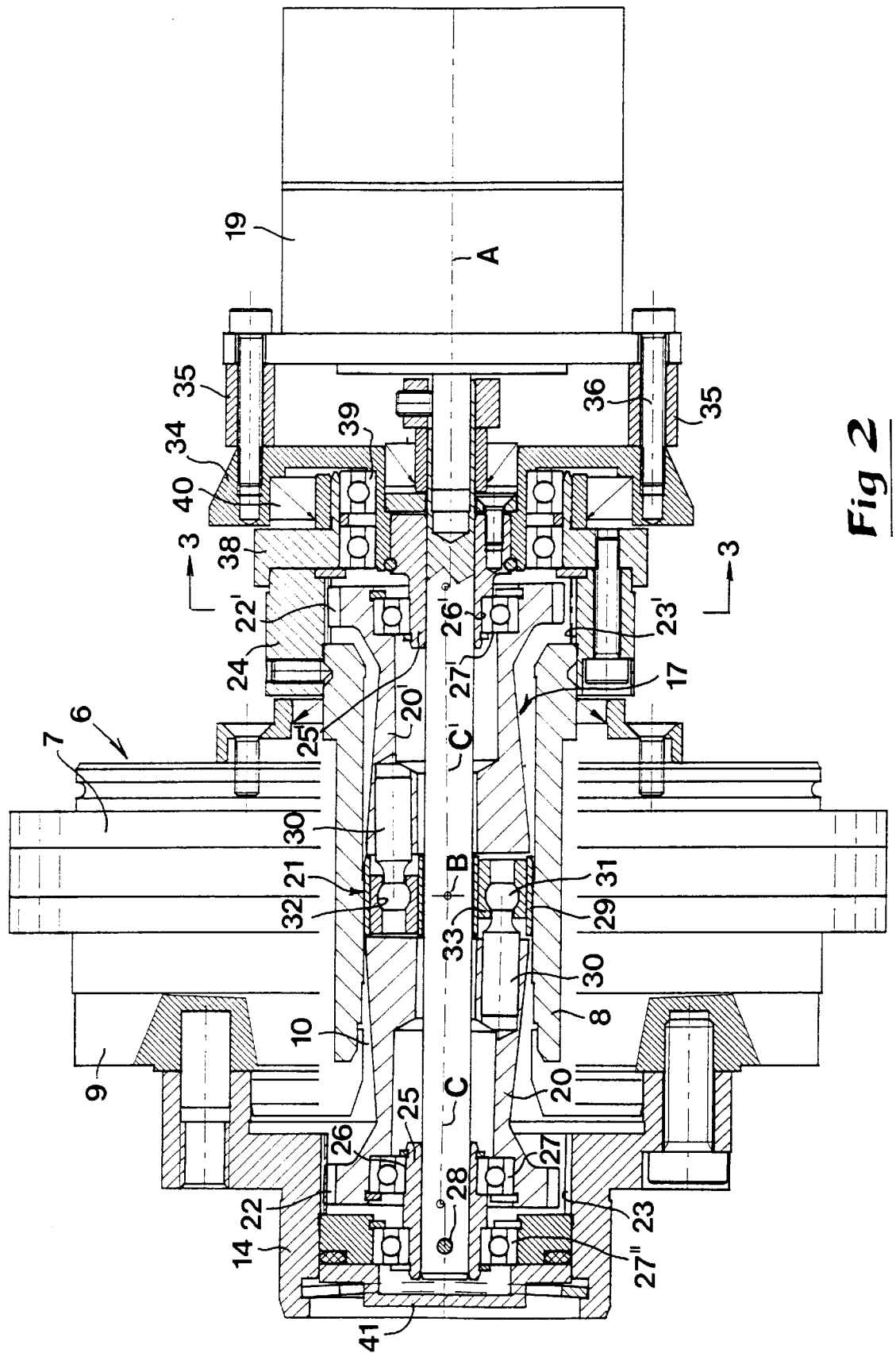
Figure 3:
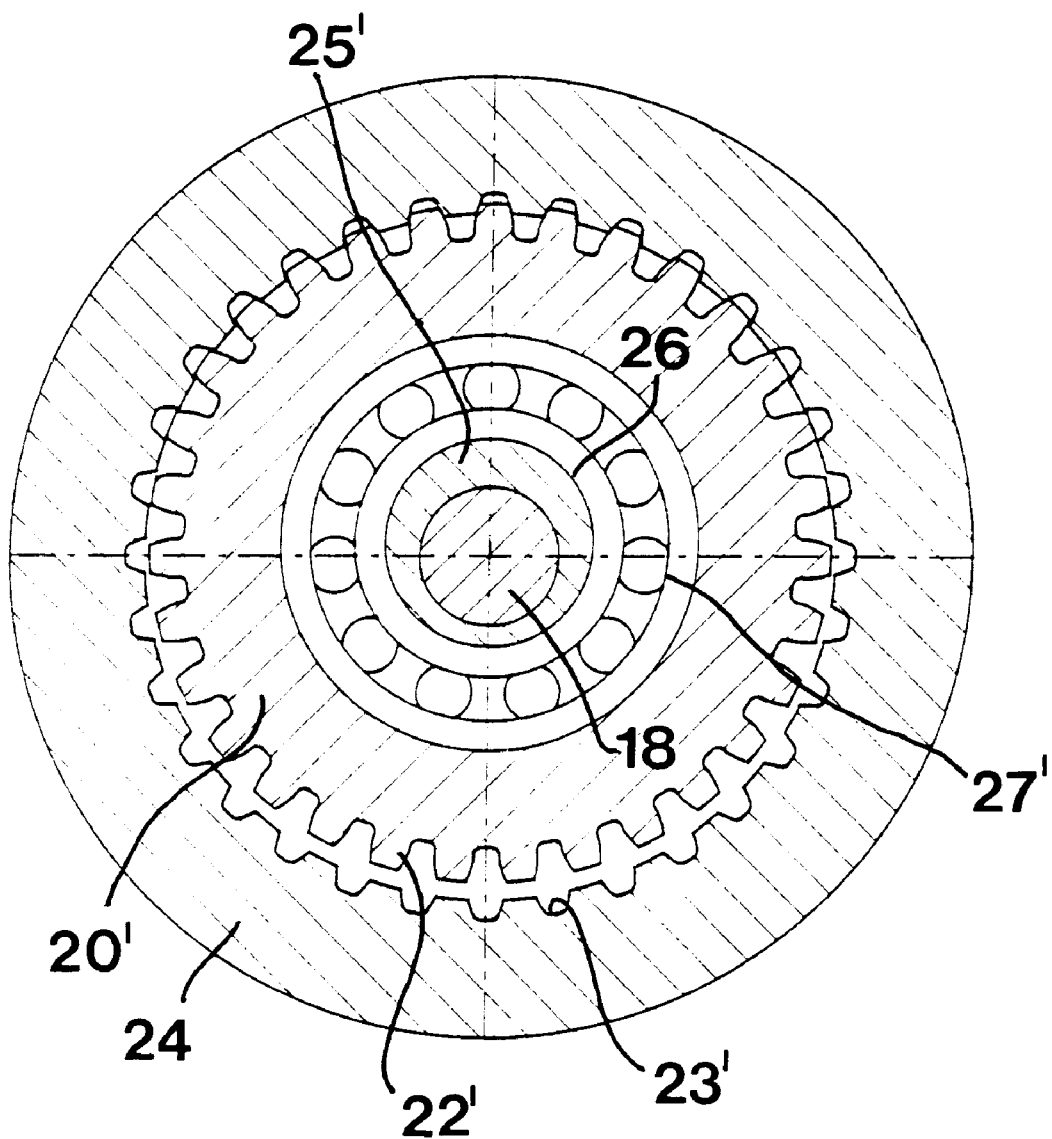

According to the present invention (see now also FIG. 2 and 3), the secondary gear unit 17 comprises two eccentric gear components 20, 20' which are internally co-rotatively connected via a coupling 21 that permits each component separately to perform eccentric movements. More specifically, in the shown example these components consist of sleeve-like bodies which may nutate separately via the coupling 21. In the region of opposed ends, the sleeve components 20, 20' have external gear rings 22, 22' which cooperate with internal gear rings designated 23 and 23', respectively. The gear ring 23 is provided on the inside of a cylinder-shaped portion of the previously mentioned connection sleeve 14, while the gear ring 23' is provided on the inside of a ring part 24 which is co-rotatively connected to the input rotary member 8 of the primary gear unit 6. In a manner known per se (see, e.g., WO 96/17187), the external gear rings 22 and 22', respectively, of the individual sleeve component 20, 20' have a smaller diameter and fewer teeth than the appurtenant internal gear rings 23 and 23', respectively. Furthermore, each external gear ring is eccentric in relation to the appurtenant internal gear ring, in a way that is further described below. In this context, it should be pointed out that the two internal gear rings 23, 23' are concentric with a central geometric axis A, around which the gear 6 as well as the adjusting shaft 18 rotate.

In order to obtain the above-mentioned eccentricity of the gear rings 22, 22' of the sleeve components, two rings 25, 25' (hereinafter named eccenter rings) are mounted on the adjusting shaft 18, the end portions of these rings facing each other being shaped with cylinder surfaces 26, 26', which are eccentric and somewhat tilted relative to the central axis A. On these eccentric cylinder surfaces are mounted bearings, more specifically ball bearings 27, 27', by means of which the sleeve components 20, 20' are freely rotatable relative to the appurtenant eccenter rings. According to the examplified embodiment, the eccenter ring 25 is co-rotatively connected to the adjusting shaft 18, as indicated by a transversal dowel 28. The other eccenter ring 25' is stationary by being co-rotatively connected with the housing of the stepping motor 19, the adjusting axis 18 being turnable or rotatable relative to the ring 25'. In practice, the difference in numbers of teeth between each individual external gear ring 22, 22' and the appurtenant internal gear ring 23, 23' may be as small as 1 or 2. As an example it may be mentioned that the individual external gear ring may have 31 teeth, at the same time as the appurtenant internal gear ring comprises 32 teeth. Although the sleeve components 20, 20' are reversed, they shall be identically the same, at least with regard to the number of teeth in the gear rings 22, 22'. Analogously, the number of teeth of the gear ring 23 must tally with the number of teeth of the gear ring 23'.

In the example, the coupling generally designated 21 between the sleeve components 20, 20', comprises a ring 29 and a number of male elements 30 extending substantially axially, which at free ends have partly spherical or ball-like elements 31. These ball elements 31 are in engagement with correspondingly partly spherical seats 32 in tube pieces 33, which are introduced into borings or barrels in the ring 29. The tube pieces 33 are axially movable in the appurtenant borings in order to absorb the admitted small, but still pronounced pendulous motion that arises when the sleeve components nutate. In this context, it should be pointed out that the two male elements in FIG. 1 arid 2 are figuratively shown for the sake of simplicity. Thus, in practice the coupling 21 comprises four tangentially equidistantly separated male elements 30, of which two are connected with the sleeve component 20 and the other two with the sleeve component 20'. The two male components that are connected with one and the same sleeve component are internally separated by 180°, and the pair of male elements of the one sleeve component are displaced by 90° in relation to the pair of male elements of the other sleeve component.

Reference numeral 34 designates an immobile or fixed base part that is stiffly joined with the housing of the stepping motor 19 via intermediate sleeves 35 and screws 36. The base part 34 could also make part of a stationary machine stand. However, in practices it is preferred to keep the base part and the stepping motor fixed in space by means of moment bars not shown which are connected to the intermediate sleeves 35 and to a corresponding base part of another cylinder comprised in the machine. In this way, the housing of the stepping motor may be mounted in a stationary condition, without having to be connected to the actual machine stand that carries the cylinder via the bearing 5. The ring part 24 is rotatably mounted in bearings relative to the base part 34 via an intermediate part 38, viz. via a set of bearings 39, e.g., ball bearings. A sealing 40 and a cap 41, the latter being provided at the opposed end of the device, delimit the interior of the secondary gear 17, in order to enclose the lubricant that is necessary for this gear.

The Function and the Advantages of the Invention

In order to facilitate the understanding of the invention, two different function states will be described below, namely a normal state of operation, in which the secondary gear unit 17 is idle, and an operative state, when the secondary gear unit enters into function and activates the primary gear unit 6.

The Normal State of Operation

Under the condition that the cylinder 4 is comprised in a printing machine, the cylinder shall be driven at a comparatively high rotation speed, e.g. 700 rpm. For this reason, the driving element 1 is brought to rotate at the rotary speed $n_1$ via an appurtenant transmission (or another arbitrary driving source), which speed shall be chosen equal to $n_4$, i.e., 700 rpm. In this condition, the stepping motor 19 is inactive (locked) and, thereby, the adjusting shaft 18 is idle. The rotary motion of the driving element 1 is transferred to the driven cylinder 4 via the first gear unit 6, from its frame body 7 to the output rotary member 9, and thereafter via the connection sleeve 15 and the keyed joint 16. In connection therewith, the connection sleeve 14 comprising the gear ring 23 also rotates. This involves that the sleeve component 20 is carried together, albeit at a rotation speed that somewhat differs from the rotation speed of the connection sleeve 14, in that the sleeve component 20, as a consequence of the intermeshing between a tooth of the gear ring 22 and the teeth of the gear ring 23, is brought to rotate around the geometric axis C, which is tilted by a small angle (0.2–2°), the tooth meshing between the gear rings 22 and 23 lying still above the not moving eccenter ring 25. Since the gear ring 22 of the sleeve component 20 has a tooth number $z_{22}$ that is smaller than the tooth number $z_{23}$ of the gear ring 23, the rotary speed of the sleeve component 20 will be:

$$n_{20} = n_4 \times z_{23}/z_{22}$$

In the preferred embodiments of the invention, $z_{23} = 20-150$ and $z_{22} = -dz$, wherein dz is a low, one-digit integer, e.g., 1 or 2. Via the coupling 21, the rotation $n_{20}$ is transmitted to the output sleeve component 20', more specifically in such a way that this sleeve component rotates around the tilted axis C'. The gear ring 22' of the sleeve component 201 is in engagement with the gear ring 23' at a point straight above the eccenter ring 25'. The rotation is geared down by the proportion $z_{22'}/z_{23'}$, whereby the ring part 24 is brought to rotate at a speed of $$n_{24} = \frac{n_{24} \times z_{23}}{z_{22}} \times \frac{z_{22'}}{z_{23'}}$$

If equal numbers of teeth are chosen in pairs for the gear rings 22, 22' and the gear rings 23, 23', then $n_{24} = n_4$. Thus, the rotary speed $n_{24} = n_4$ is transmitted to the input rotary member 8 of the primary gear. Hence, the two rotary members 9 and 8 of the primary gear rotate at one and the same speed $n_4$. In this way, the desired output rotary speed $n_4$ is obtained by the fact that the element 1 is driven at the same rotation speed $n_4$. In other terms, under these normal operation conditions (steady-state), the primary gear 6 works as a stiff coupling that guarantees a gear ratio of exactly 1:1 between the elements 1 and 4.

The Operative State of the Adjusting Device

During running operation, need may sometimes arise to correct the position of the angle of rotation of the cylinder 4 relative to the driving cylinder or shaft. When this occurs, the stepping motor 19 is activated in order to transmit to the adjusting shaft 18 a limited rotary motion of a positive or negative sort (a positive rotation involves an addition of speed, while a negative rotation involves a braking). In order to better understand the function of the other gear unit, it is hypothetically assumed that the frame body 7 of the primary gear unit 6 is not moving, and that the adjusting shaft 18 is initially brought to rotate, more specifically by means of the stepping motor 19. The eccenter ring 25 is co-rotatively connected with the adjusting shaft 18 and brings now the sleeve component 20 to perform a nutating motion, in that the tilted geometric axis C moves as a generatrix on an imaginary cone surface, whose apex is situated at the point B. Thereby, the intermeshing between the gear rings 22, 23 will rotate and the sleeve component 20 be slowly rotated in the opposite direction, towards the shaft 18, in the way that is characteristic of nutating eccentric gears and that is described in, e.g., WO 96/17187. If the motor rotates at a speed of $n_{18}$, the sleeve component 20 will have the speed:

$$n_{20} = -n_{18} \times (z_{23} - z_{22})/z_{23}.$$

In a manner described above, this rotation is transmitted via the coupling 21 to the other sleeve component 20', whereby the latter will rotate around the not moving geometric axis C' and drive the ring part 24 (and, thereby, also the input rotary part 8 of the primary gear), more specifically at the speed of:

$$n_8 = -n_{18} \times (z_{23} - z_{22})/z_{23} \times z_{22}/z_{23},$$

With the following concrete numerical values from a preferred embodiment, one obtains: $n_8 = -100/33,03$, wherein $n_{18} = 100$ rpm, $z_{23} = z_{23'} = 32$ and $z_{22} = Z_{22'} = 31$. In other terms, a high gear reduction is obtained already in the secondary gear unit 17. If at the same time a gear reduction of 59:1, or alternatively 179:1 (which both constitute preferred embodiments for some practical applications), is chosen in the first gear step, a total gear reduction of the rotation speed of the motor 19 is obtained to a relative motion between the elements 1 and 4 of not less than:

1949:1 and 5912:1, respectively

The importance of these extremely large gear reduction ratios are illustrated by the following example:

Presume that one wishes to change the phase position between two printing cylinders in a printing machine for multi-colour printing in such a way that a yellow printed picture is to be moved by only 0.01 mm in the circumferential direction of the cylinder, relative to a blue printed picture, in order to obtain a perfect green picture without any colour dislocations. In large printing machines for the production of newspapers, the diameter of such printing cylinders may amount to about 350 mm. Then the desired phase displacement becomes:

$$\alpha=0.01/175=1/17500 \text{ radians or}=1/109956 \text{ revolutions.}$$

With an adjusting device according to the invention, having a total gear reduction of 5912:1, the motor shall thereby be brought to move only by 0,054 revolution (=19°) in order to bring about the desired phase displacement. A suitable motor for this type of duties is the stepping motor, which according to conventional embodiments may be brought to move by increments of 1.8°. The resolution for a motion of one step then becomes:

$$0.01 \times 1.8/19 = 0{,}93 \times 10^{-3} = \text{about } 0.001 \text{ mm}$$

The necessary motor torque for driving the displacement is in a usual manner dependent on the gear reduction. A large gear reduction makes it possible to use smaller and thereby cheaper motors and drive electronics. For alternative technical solutions which do not offer such a large gear reduction, it is required that the motor be capable of moving by smaller increments and by considerably larger torques. In practice, this may be a considerable drawback from a technical point of view and also involve higher costs. For example, it may become necessary to introduce a further gear step between the motor and the adjusting device.

The advantages of the invention should be evident. By using two eccentric gear components in the secondary, normally idle gear unit, an extremely pronounced gear reduction may be obtained in two compactly assembled gear steps of the relative rotary motion that is required for a fine adjustment of a driven element relative to a driving one. Thus, as examplified above, an imaginary point on the envelope surface of a cylinder or a shaft may be readjusted with an accuracy that is even smaller than 0.001 mm. Moreover, the power dissipation for the power transmission between the driving and driven elements becomes very small (in practice less than 1%), implying that the heat release in the device is reduced to a minimum.

Feasible Modifications of the Invention

The invention is not restricted solely to the embodiment as described above and shown in the drawings. Thus, the eccenter ring 25' that is stationary in the example, could be made in such a way that it may be rotated in order to give further adjusting possibilities, e.g., by being connected to some other function in the machine or to some other motor. Further, it is feasible to connect the carrier 14 of the gear ring 23 with the gear housing or frame body 7, instead of with the output rotary member 9 of the primary gear.

It may also be underlined that the two eccenteric gear components, which together form the secondary gear unit 17, also may be constructed in another way than as nutating sleeve components. Thus, the eccentric gear components may also consist of substantially cylindrical gear wheels which are interconnected via a coupling in the form of a cross roller plate, for instance in the way shown in EP 93850179.8.

I claim:

1. An adjusting device for providing changes of an angle of rotation between two rotary elements (1, 2), which are driving and driven, respectively, and which under normal operation conditions will be driven at one and the same rotary speed, comprising on one hand a first gear unit (6) with a frame body (7), the first gear unit acting between the elements and being co-rotatively connected with one of said elements, in order to accompany said one of said elements during rotation, input and output members (8, 9) being rotatable relative to the first gear unit in order to adjust the angle of rotation between the elements (1, 2), and on the other hand a second gear unit (17) arranged to cooperate with an adjusting shaft (18) that is rotatable between a given, not moving rest position during said normal operation conditions, and another position, the shaft during such rotation driving the second gear unit (17) in order to transfer to one (8) of the rotary members of the first gear unit (6) a relative motion of the angle of rotation, which motion after a gear reduction by means of the first gear unit provides for a restricted change of the angle of rotation between said driving and driven elements (1, 2), wherein the second gear unit (17) comprises two eccentric gear components (20, 20') which are co-rotatively connected via a coupling (21) that permits each component separately to perform eccentric translation movements, and which have external gear rings (22, 22') arranged to cooperate with internal gear rings (23, 23'), one of the internal gear rings is co-rotatively connected with the input rotary member (8) of the first gear unit and the other internal gear ring is connected with the output rotary member (9), and in that the external gear rings (22, 22') of the individual eccentric gear components have a smaller diameter and fewer teeth than the appurtenant internal gear rings (23, 23') and are eccentric relative to the internal gear rings, and each of the eccentric gear components being rotatably mounted on eccenter rings (25, 25'), the eccenter rings being arranged on the adjusting shaft (18), of which rings one (25) is co-rotatively connected with the adjusting shaft (18), while the other ring (25') is permitted to rotate relative to the shaft.

2. Adjusting device according to claim 1, wherein said eccentric gear components comprises, nutatable sleeves (20, 20'), whose gear rings (22, 22') are placed at ends which are opposed to the coupling (21).

3. Adjusting device according to claim 2, wherein the coupling (21) between the nutatable sleeve components (20, 20') comprises a coupling ring (29) and a number of axially extending male elements (30) with partly spherical, ball-like elements (31) arranged in engagement with correspondingly partly spherical seats (32) in tube pieces (33) that are axially movable in barrels in the coupling ring.

4. Adjusting device according to claim 1, wherein the adjusting shaft (18) is connected with an output shaft to a stationary stepping motor (19), by means of which the adjusting shaft may be one of rotated and braked.

5. Adjusting device according to claim 2, wherein the first gear unit (6) is substantially ring-shaped by having a central through cavity (10), and the adjusting shaft (18) extends through said cavity (10) and has one of its eccenter rings (25) and the cooperating gear ring (22) on the one sleeve component (20) located at one side of the first gear unit, while the other eccenter ring (25') and the gear ring (22') cooperating with it on the other sleeve component (20') are located at an opposite side of the first gear unit.

6. Adjusting device according to claim 5, wherein the eccenter ring (25) being co-rotatively connected with the adjusting shaft (18) is placed at a shaft end that is distant from a stepping motor (19), while the other eccenter ring (25'), relative to which the adjusting shaft may be rotated, is placed in a region between the first gear unit (6) and the stepping motor (19).

7. Adjusting device according to claim 2, wherein the adjusting shaft (18) is connected with an output shaft to a stationary stepping motor (19), by means of which the adjusting shaft may be one of rotated and braked.

8. Adjusting device according to claim 3, wherein the adjusting shaft (18) is connected with an output shaft to a stationary stepping motor (19), by means of which the adjusting shaft may be one of rotated and braked.

9. Adjusting device according to claim 3, wherein the first gear unit (6) is substantially ring-shaped by having a central through cavity (10), and the adjusting shaft (18) extends through said cavity (10) and has one of its eccenter rings (25) and the cooperating gear ring (22) on the one sleeve component (20) located at one side of the first gear unit, while the other eccenter ring (25') and the gear ring (22') cooperating with it on the other sleeve component (20') are located at an opposite side of the first gear unit.

10. Adjusting device according to claim 4, wherein the first gear unit (6) is substantially ring-shaped by having a central through cavity (10), and the adjusting shaft (18) extends through said cavity (10) and has one of its eccenter rings (25) and the cooperating gear ring (22) on the one sleeve component (20) located at one side of the first gear unit, while the other eccenter ring (25') and the gear ring (22') cooperating with it on the other sleeve component (20') are located at an opposite side of the first gear unit.

11. Adjusting device according to claim 7, wherein the first gear unit (6) is substantially ring-shaped by having a central through cavity (10), and the adjusting shaft (18) extends through said cavity (10) and has one of its eccenter rings (25) and the cooperating gear ring (22) on the one sleeve component (20) located at one side of the first gear unit, while the other eccenter ring (25') and the gear ring (22') cooperating with it on the other sleeve component (20') are located at an opposite side of the first gear unit.

12. Adjusting device according to claim 8, wherein the first gear unit (6) is substantially ring-shaped by having a central through cavity (10), and the adjusting shaft (18) extends through said cavity (10) and has one of its eccenter rings (25) and the cooperating gear ring (22) on the one sleeve component (20) located at one side of the first gear unit, while the other eccenter ring (25') and the gear ring (22') cooperating with it on the other sleeve component (20') are located at an opposite side of the first gear unit.

* * * * *